May 21, 1935. O. NEUENSCHWANDER 2,002,124
ELECTRIC DRIVING DEVICE
Filed Aug. 14, 1933 2 Sheets-Sheet 1

Inventor
Otto Neuenschwander
By B. Singer
Attorney

May 21, 1935.　　　O. NEUENSCHWANDER　　　2,002,124
ELECTRIC DRIVING DEVICE
Filed Aug. 14, 1933　　　2 Sheets-Sheet 2

Inventor
Otto Neuenschwander
By Bilinger, atty.

Patented May 21, 1935

2,002,124

UNITED STATES PATENT OFFICE 2,002,124

ELECTRIC DRIVING DEVICE

Otto Neuenschwander, Kilchberg, Switzerland

Application August 14, 1933, Serial No. 685,143
In Switzerland August 27, 1932

1 Claim. (Cl. 172—126)

The present invention relates to an electromagnetic driving device particularly applicable for driving clockworks, switch apparatus, relays, valves and tools. Similar devices are already known which instead of a rotary armature are provided with an oscillating armature which either oscillates in synchronism with the alternating current by which it is magnetized or with the natural frequency of the system in the case of continuous current drive. A number of oscillating armature systems are known in principle. They can be divided into two groups of which one operates with polarized magnet fields (permanent magnets) and therefore the oscillating armature assumes an oscillating number corresponding with the period number per second of the alternating current. The second group operates without permanent magnets so that the oscillating armature assumes an oscillating frequency corresponding with the pole changing number per second of the alternating current provided that in both cases the oscillating system is tuned to the alternating current frequency in question.

The first systems have a particularly low watt consumption or good efficiency which is due mostly to the use of large and strong magnets. The latter, however, in comparison with their given output require a high input for their operation and are heavy. Further the armatures, which are very heavy relatively to the output, produce vibration in the apparatus systems and thus particularly cause noise for which separate sound damping devices become necessary.

The above mentioned disadvantages of the previously known systems are entirely eliminated by the present invention which relates to a new method of constructing the magnet system of the oscillating device.

The subject of the invention is an electromagnetic driving device wherein the armature of a magnet, energized by alternating current carries out oscillations in the direction of the lines of forces emanating from the poles of the magnet and wherein the core cross section of the electromagnet at the poles is increased in the manner of pole shoes of which the surfaces turned towards the armature are provided with slots or holes extending therethrough into which project to such an extent at the end of the oscillation, cooperating iron parts, forming the armature and moved in the same direction, that the pulling force exerted on the armature in this end position thereof, in the direction of movement is at least approximately of zero value.

In the following description the most essential features will be more fully described with reference to Figs. 1 to 11, in which are shown diagrammatically the principal forms of construction of the subject of the invention and examples of construction are illustrated which show that the principle of the invention can be applied in various ways.

Figure 1:
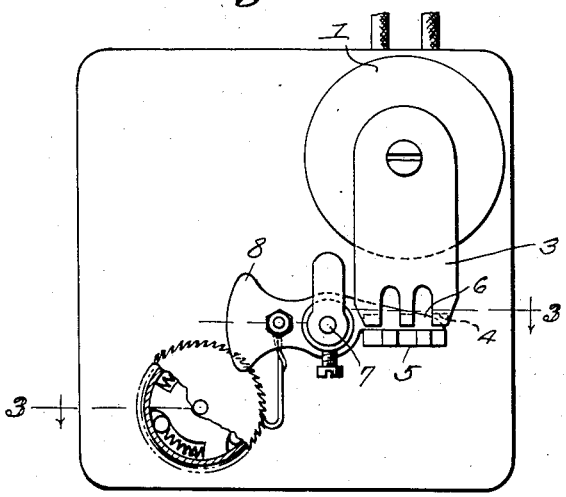
Fig. 1 is an elevation partly in section of electric driving apparatus constructed and arranged in accordance with my invention.
Figure 2:
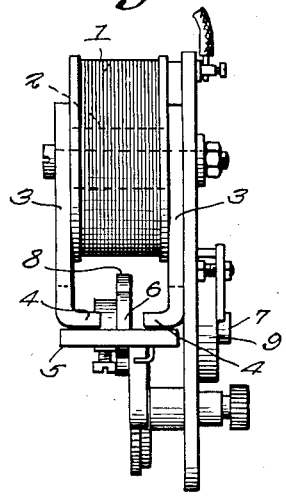
Fig. 2 is a similar view at right angles to Fig. 1.
Figure 3:
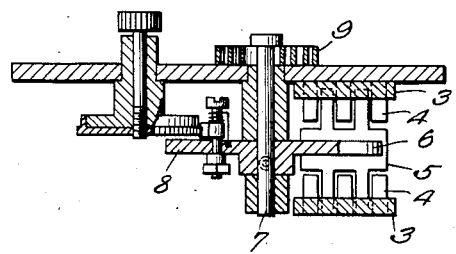
Fig. 3 is a horizontal sectional view of the same on the planes indicated by the line III—III of Fig. 1.
Figure 4:
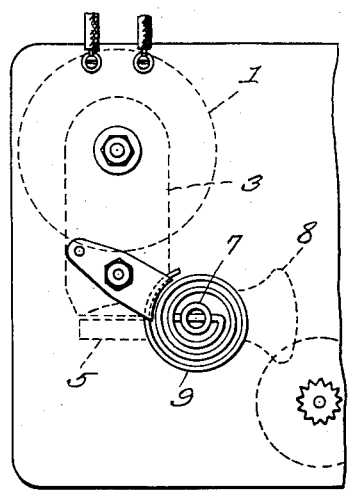
Fig. 4 is an elevation of the same showing the side opposite that disclosed in Fig. 1.

For explaining the operations of the magnet system the fundamental formulæ in connection with the magnetic resistance in air and the known attractive force formula for magnets may be used, which are as follows:

1. $$F = \frac{S.B^2}{8.\pi 980} \text{(Gramm)}$$

2. $$W = \frac{d}{S}$$

In these:

$S$ = air cross section between the two pole surfaces, $B$ = density of force lines in air, $d$ = air gap length between the two pole surfaces, $W$ = magnetic resistance of the air distance.

From Formula 1 it will be seen that the attractive force of a magnet solely depends on the size of the oppositely disposed pole surfaces and the density of the force lines between them. In the case of a given magnetizing force H the latter depends on the magnetic resistance W between the pole surfaces. The cross section and the length of the iron yoke which forms the remaining portion of the magnetic circuit and connects the two pole surfaces do not appear in the formula and therefore only play a secondary part. Usually the dimensions of the yoke are selected so large that only a few ampere turns are necessary to drive the magnetic flux through the yoke and the much larger part of the available ampere turns serve to overcome the air gap between the pole faces.

From Formula 2 it will be seen that the magnetic resistance in air, independent of the density of the force lines in the air gap (air path) is directly proportional to the length of the air gap and inversely proportional to the cross section of the air path.

In order to utilize as advantageously as possible a magnetic operating system of given size or given magnetizing force it is necessary to select the operative path of the armature as large as possible but on the other hand to keep the resistance of the power flux in air as small as possible. As however in Formula 2 $d$ is identical with the operative stroke of the armature it is also necessary to make S, i. e. the pole faces, as large as possible, in order to correspond with the required conditions. In Formula 1 it is further assumed that the force lines between the pole and armature faces can pass over vertically or that their resultants are as vertical as possible to the pole faces. It is therefore important that in a magnetic operating system with maximum operating capabilities this condition is fulfilled as completely as possible for the various operative positions of the armature.

The above described knowledge was of assistance and importance in the construction of the electromagnetic gears forming the subject of the present invention and it will be understood that they may be incorporated in various forms of construction of which that shown in the accompanying drawings is only illustrated by way of example.

In Figs. 1 to 4, 1 is a coil winding of copper wire through which passes an alternating current of usual main frequency. 2 is an iron core and 3 are two pole limbs with the pole faces 4. The armature 5 is movably arranged relatively to the stationary magnet system in such a manner that it can enlarge or reduce its air distance from the pole faces.

Figure 5:
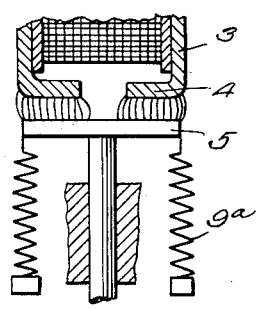
Fig. 5 is a detail transverse sectional view illustrating a modification.

The armature is mounted on a lever 6 on the shaft 7 so that it can be moved towards or withdrawn from the pole face 4. 8 is a counterweight for loading the entire system on the shaft. 9 is a spiral spring which imparts to the oscillating system comprising said spring and the armature a definite rest position, i. e. directing force and also together with the armature constitutes a mechanical oscillating system of given natural frequency. In Fig. 5 is shown a similar arrangement wherein the armature cannot rotatably oscillate on a shaft as above described, but is mounted in guides so that in combination with one or more springs 9a it can carry out longitudinal oscillations. Any suitable means may be employed within the scope of the invention to cause the armature to be guided in a right line.

When the oscillating system is adapted to be set in harmonic oscillations by the electromagnet then, theoretically, the alternating current frequency must agree with the natural frequency of the system or vice versa. (In practice it is not absolutely necessary.) It is also important that the attractive force characteristic of the electromagnet stands in a definite relation with the directing force characteristic of the spring over an oscillating period. The main condition for this is that the magnetic pulling force does not exceed the amount of the spring force in an oscillating end position as otherwise non-harmonic armature oscillations would be produced whereby the armature would fall out of step with the alternating current energization.

The magnetizing force of the current coil owing to the alternating current which energizes it passes during one oscillation of the armature twice through the value zero and the maximum value. The armature is also attracted by the lines of force from the opposing faces of the pole pieces and hence the armature pulling force characteristic, is determined by an algebraic addition of the pulling force characteristic and the alternating current characteristic. The result of this is that the armature pulling force increases as the armature approaches the pole faces.

Figure 6:
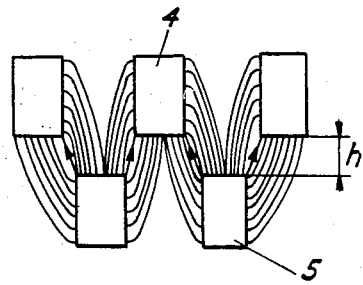
Fig. 6 is a diagram of the pole and armature elements and illustrating the magnetic lines of force.
Figure 7:
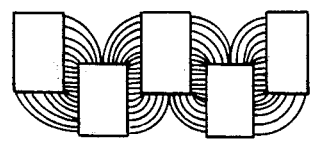
Fig. 7 is a similar view with the armature in another position.
Figure 8:
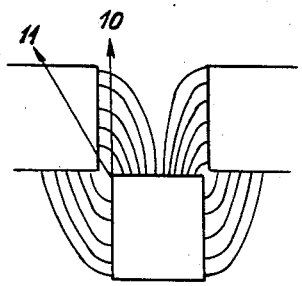
Fig. 8 is a similar view on a larger scale.

As will be seen the armature 5 and pole surfaces 4 are so provided with grooves, slots or holes that the armature face and pole face act relatively to one another as positive and negative for the purpose of adapting the pulling force characteristic of the armature to the directing force characteristic of the system spring. The method of operation of these armature constructions can be explained easily with reference to Figs. 6 and 7. In Fig. 6 the armature is in the drawn out (withdrawn) end position, whilst the force lines from the pole wings pass across almost vertically to the armature bars and, in spite of the lesser magnetization in this position, exert a favourable pulling force direction. The resultant of all magnetic forces exerts a pulling force parallel to the direction of movement of the armature and imparts a corresponding acceleration thereto. In Fig. 8 the force line 10 shows the components of the attractive force in a vertical direction (component of 11) in so far as the force line 11 shows the resultant attractive force of all the force lines. As the magnetic lines strike the pole faces at an angle there occurs a slight difference in the attracting force in the vertical direction. In the positions of the armatures and pole faces shown in Figs. 6 and 7 the attractive forces are subjected to the same Formula 1 which applies when the pole faces lie exactly vertically above one another. A small difference in the attractive forces is as stated above, present but this difference is very slight. If the forces 10 and 11 are measured it will be ascertained that the attractive forces, in the position of the pole faces and armature according to Figs. 6 and 7 and with the pole faces lying one above the other, are in the ratio of about 28 to 30. The arrangement with projections of an armature entering grooves of a pole has considerable advantages and not only equalizes the slight loss in attractive force in the arrangement in Figs. 6 and 7 but also enables an increased attractive force to be obtained.

At the moment at which the projections of the armature 12 project into the grooves of the pole faces 13 and 14 the attractive forces are subjected to a different law to that indicated by the Formulæ 1 and 2. In this case, in Fig. 9, the following formula comes into consideration as regards the attractive force:

3. $$F = c\frac{2.\pi.ni}{l}(\cos.\alpha_2 - \cos\alpha_1)$$

wherein:

F=attracting force (for the dot shaped magnetic mass=1)
$ni$=ampere turns
$l$=length of grooves (air gap)
$c$=a constant factor.

Figure 9:
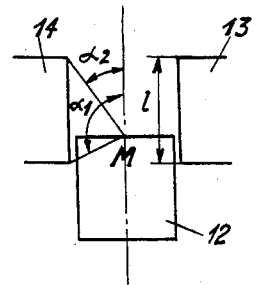
Fig. 9 is a similar view illustrating the formula involved as regards the attractive forces.

If the magnets 13, 14 are considered as a solenoid, the armature, which may be regarded as a dipping core, is drawn into the groove so that magnets and poles assume the position shown in Fig. 9. Whilst with vertically superposed pole faces the armature can cover a distance $h$ in Fig. 6, as in this case the grooves are not provided the armature can cover the distance l h when the grooves are provided. Whilst in both cases the same attracting force is exerted over the distance h the construction with the grooves has the advantage that the attracting force still comes into play along the path l. When moving along the path l in Fig. 9, the Formula 3 applies and when traversing the path h in Fig. 6 the Formula l applies. In order to drive magnetic lines through an air resistance the ampere turns necessary for this are proportional to the length of the air gap. The attractive force of a magnet, however, decreases with the square of the force lines passing through the air cross section. From the Formula 3 it follows that the attractive force simply decreases in proportion to the length of the groove, whilst in any case also cos $\alpha_1$ and cos $\alpha_2$ influence the attractive force. A cursory examination however shows at once that these proportions influence the attractive force F much less unfavourably than the square of the force lines according to Formula 1.

The specified operative principle, as stated above, can be applied to different methods of construction, the main fact being that as large magnetic surfaces as possible in a small space are opposite one another and the separate force lines according to the Formula 2 have to overcome as small an air distance as possible. There may for example be provided more than two pole faces and armature co-operating therewith, whilst the latter may also be located on different sides of the axis of rotation.

According to this principle favourable oscillating armature systems can be produced which are considerably more effective than the systems which have already become known with permanent magnets or ordinary alternating current systems.

The prongs or teeth in the armature and the bores or grooves in the pole shoes may also be conical or be provided with side walls inclined to the direction of movement in such a manner that the attractive force when approaching and on the entrance of the armature or in the pole shoes gradually decreases and any operation in shocks is avoided.

The armature subjected to the action of the alternating current field enters, by the selection of the arrangement described, into harmonic oscillation whilst its inherent energy shape rocks between potential and kinetic. From the latter energy may be withdrawn therefrom by means of a known pawl or ratchet gear and used mechanically. For purposes where energy is required in the form of impulses the energy may be withdrawn from the armature directly, i. e. without this device. The work given out is naturally replaced by magnetic work and this again produced by electrical energy in the magnet coil.

The efficiency between input electrical energy and output mechanical energy is relatively very favourable as specifically only very small masses have to be moved and the heat losses can be kept very small by a sufficiently large coil winding.

As regards the pawl or ratchet gear device there is only shown in Fig. 1, one of the possible arrangements which has particular advantages. The impulse or also pulling pawl engages with a driving wheel, provided with ratchet teeth, which is connected to the shaft to be driven by a friction gear. This preferably consists of three or more rollers, which are pressed by springs into the wedge-shaped reduced space between the driving wheel and mounting. By this, at least threefold, locking, there is effected an absolutely allowable multiple return locking which is uninfluenced by the mounting of the thrust wheel.

The steady operation free from shock of all oscillating armature systems also depends to a large extent on the accurately fitting mounting or guiding of the armature. When the armature is secured to an oscillating shaft as in Fig. 3, there may be used with considerable advantage a mounting according to Fig. 10.

Figures 10, 11:
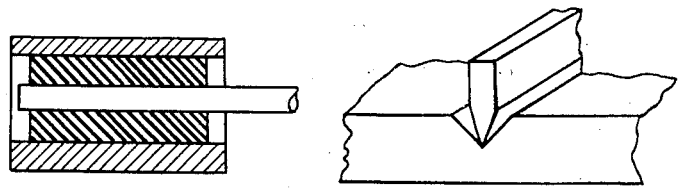
Fig. 10 is a detail sectional view of a modified form of bearing.
Fig. 11 is a detail perspective illustrating another form of devices for mounting the armature.

In Fig. 10 there are provided instead of metal bearing bushes, bushes of elastic rubber. When the thickness of the rubber layer is sufficiently large the bearing does not require any lubrication as with the relatively small angle of oscillation of the armature the turning of the shaft relatively to the fitting is taken up by the rubber itself.

In Fig. 11 is shown a further method of mounting the armature which is also for the purpose of meeting the otherwise necessary accuracy of the usual mountings. The system shaft is in the form of a knife edge which in turn is mounted in one or more wedge-shaped grooves and secured in position forcibly by an additional spring force. Also this mounting enables the shaft to carry out small angular oscillations without any appreciable bearing friction occuring which damps the armature oscillations. This mounting has similar advantages to that referred to above but avoids the use of rubber which would not be suitable for some purposes of the device.

The driving device described is particularly suitable for driving electric clocks or for winding the spring thereof, further for driving electric switch apparatus, relays and signal devices. In a similar arrangement but with a straight line oscillating armature it is suitable with considerable advantage for the actuation for example of valves, pumps, tools and appliances.

What I wish to secure by U. S. Letters Patent is:—

An electric driving apparatus of the class described, comprising an electro-magnet having oppositely disposed pole pieces forming oppositely disposed widened portions arranged in a common plane and having slots extending to and open at their opposing ends, and an armature arranged for movement across the common plane of the pole pieces toward and from the intermediate portion of the electro-magnet in a path substantially at right angles to said common plane and having extensions at its opposite sides adapted to enter the slots of the pole pieces when the armature and pole pieces are in substantially the same plane and thereby reduce the electro-magnetic pulling force of the apparatus to approximately zero when the armature is in such position.

OTTO NEUENSCHWANDER.